United States Patent
Acosta et al.

(10) Patent No.: US 10,563,662 B2
(45) Date of Patent: Feb. 18, 2020

(54) METAL SURFACE PREPARATION

(71) Applicant: General Electric Company, Schenectady, NY (US)

(72) Inventors: Manuel Acosta, Cincinnati, OH (US); Gregory Gemeinhardt, Park Hills, KY (US); Joshua Miller, West Chester, OH (US); Michael Franks, Cincinnati, OH (US); Lara Liou, Cincinnati, OH (US); James Hahn, Loveland, OH (US)

(73) Assignee: General Electric Company, Schenectady, NY (US)

( * ) Notice: Subject to any disclaimer, the term of this patent is extended or adjusted under 35 U.S.C. 154(b) by 512 days.

(21) Appl. No.: 15/343,645

(22) Filed: Nov. 4, 2016

(65) Prior Publication Data

US 2018/0128283 A1   May 10, 2018

(51) Int. Cl.
| | | |
|---|---|---|
| *B32B 7/12* | (2006.01) | |
| *F04D 29/02* | (2006.01) | |
| *B32B 15/092* | (2006.01) | |
| *B32B 15/18* | (2006.01) | |

(52) U.S. Cl.
CPC .............. *F04D 29/023* (2013.01); *B32B 7/12* (2013.01); *B32B 15/092* (2013.01); *B32B 15/18* (2013.01); *B32B 2255/06* (2013.01); *B32B 2255/20* (2013.01); *B32B 2262/106* (2013.01); *B32B 2307/554* (2013.01); *B32B 2603/00* (2013.01)

(58) Field of Classification Search
CPC ... B32B 15/092; B32B 15/18; B32B 2255/06; B32B 2255/20; B32B 2262/106; B32B 2307/554; B32B 2603/00; B32B 7/12; F04D 29/023; F04D 29/324; F05D 2240/303; F05D 2300/171; F05D 2300/224; F05D 2300/603
USPC ........ 216/33, 34, 55, 100, 102, 35; 438/715, 438/720
See application file for complete search history.

(56) References Cited

U.S. PATENT DOCUMENTS

| | | | |
|---|---|---|---|
| 3,607,455 A | | 9/1971 | Renshaw |
| 4,636,434 A | | 1/1987 | Okamura et al. |
| 5,275,696 A | | 1/1994 | Gaskin et al. |
| 6,238,783 B1 | * | 5/2001 | Komai ............... B05D 7/51 428/312.8 |
| 7,589,134 B2 | | 9/2009 | Pfenninger et al. |
| 8,487,206 B2 | | 7/2013 | Urushihara et al. |
| 9,080,060 B2 | | 7/2015 | Beaudry et al. |
| 9,211,600 B2 | * | 12/2015 | Sekine ............... C04B 35/563 |
| 9,216,241 B2 | | 12/2015 | Kyomoto et al. |
| 2002/0124915 A1 | * | 9/2002 | Kobayashi ......... C22C 19/057 148/562 |
| 2011/0016717 A1 | * | 1/2011 | Morrison ............ B22F 3/105 29/889.72 |

(Continued)

FOREIGN PATENT DOCUMENTS

| | | |
|---|---|---|
| EP | 2821526 | 7/2015 |
| WO | 2014146972 | 9/2014 |

*Primary Examiner* — Lan Vinh
(74) *Attorney, Agent, or Firm* — General Electric; Kristi Davidson

(57) ABSTRACT

A part that includes a metal layer positioned on it. The part includes a composite core. A metal layer is positioned on the composite core such that the layer of adhesive is sandwiched between the composite core and the metal layer. A layer of smut that is positioned between the layer of adhesive and the metal layer.

13 Claims, 2 Drawing Sheets

(56) References Cited

U.S. PATENT DOCUMENTS

2011/0120972 A1\* 5/2011 Faulkner ................ G01N 21/91
216/57

\* cited by examiner

METAL SURFACE PREPARATION

BACKGROUND OF THE INVENTION

The present invention relates to preparing a metal surface to be adhered to a substrate and more specifically to preparing a metal surface to be adhered to a composite substrate such that an aircraft component is formed.

It is known to reinforce and to protect composite structures with metal surfaces and edges. For example, it is known to protect the leading-edge of a turbine fan blade that is formed of a carbon of fiber material with a metallic leading-edge. Conventionally, the metallic leading-edge is formed of a titanium alloy. One problem with conventional leading-edges is that the type of materials used limit the potential design configurations of turbomachinery blades, such as fan blades. In this regard, strength limitations of the material limit how thin the leading-edge can be. Other, stronger, material such as steel and/or nickel alloys can be utilized as a metallic leading-edge. Conventional methods of adhering such material to substrates are inadequate for use in some applications such as turbomachinery blades. Therefore there is a need for a method to adhere a material other than a titanium alloy such as steel and/or a nickel alloy to a substrate.

BRIEF DESCRIPTION OF THE INVENTION

This need is addressed by a method of forming a smut layer on a metal surface that is configured to promote adhesion between the metal surface and an adhesive layer for bonding to a substrate such as a composite material.

According to one aspect of the present invention, there is provided a bonded part. The bonded part includes a substrate and a metal layer. A layer of adhesive is between the substrate and the metal layer. A layer of smut is between the layer of adhesive and the metal layer.

According to another aspect of the present invention there is provided a method for adhering a metal layer to a composite core. The method includes the steps of: heat-treating the metal layer; forming a layer of smut on the metal layer; positioning the metal layer relative to the composite core such that the layer of smut is between the metal layer and the composite core; and positioning the metal layer and the composite core such that a layer of adhesive is between the layer of smut and the composite core.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
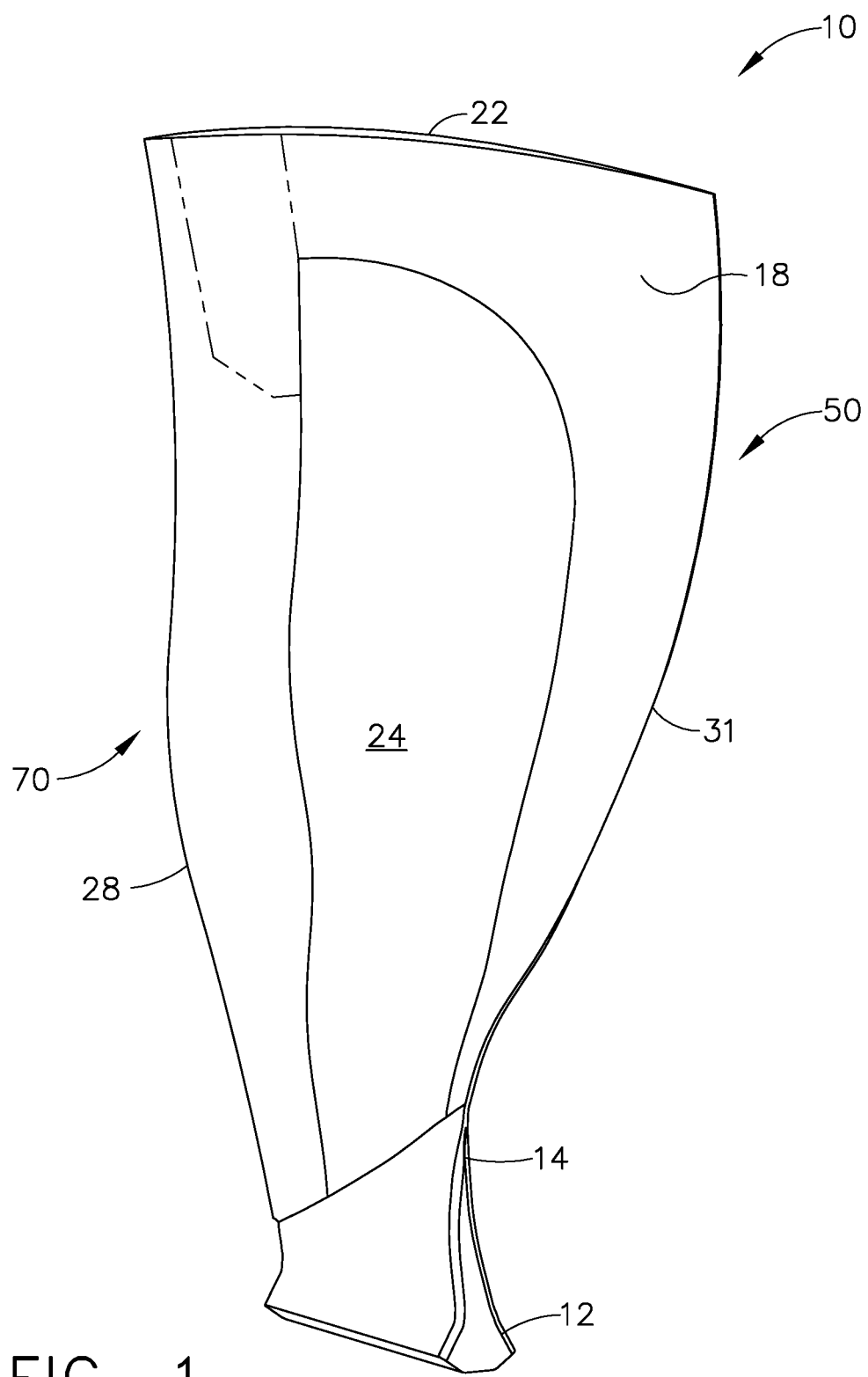
FIG. 1 is a perspective view of a turbomachinery blade, specifically a fan blade, having a metal (MLE) clad leading-edge according to the present invention.

Referring to the drawings wherein identical reference numerals denote the same elements throughout the various views, FIG. 1 illustrates a fan blade 10 that is formed as a bonded part and includes a substrate such as a composite core 50 and a metallic protective leading-edge cover or cladding 70 that is adhered to the composite core 50. The fan blade 10 extends from a dovetail 12 to a tip 22. The fan blade 10 includes a blade shank 14. The fan blade 10 also includes an airfoil 18. The airfoil 18 defines a concave pressure sidewall 24, a leading-edge 28, and a trailing edge 31. It should be appreciated that the fan blade 10 is merely an example, and that parts other than fan blades, including but not limited to other kinds of turbomachinery blades, can also be adhered to metal in accordance to with the method described below to form a bonded part. Bonded parts can be utilized as airfoils and other objects subject to impact.

Figure 2:
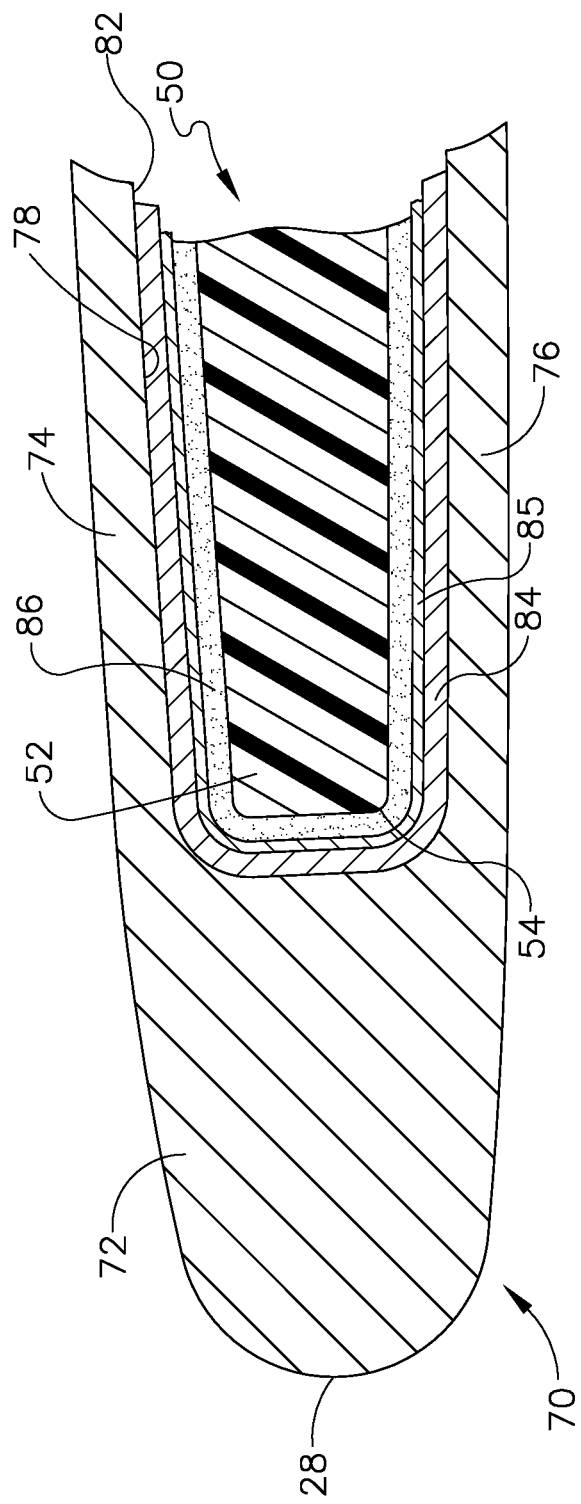
FIG. 2 is a sectional view of a portion of the leading-edge of the turbine blade shown in FIG. 1.

Referring now to FIG. 2, the composite core 50 includes an inner leading-edge 52 which is located near the leading-edge 28 of the fan blade 10. The inner leading-edge 52 defines an inner nose surface 54. The composite core 50 preferably includes carbon fiber embedded in a polymeric resin to form a polymer matrix composite or "PMC". By way of example and not limitation, the polymeric component of a PMC can be one of the following: epoxy, polyimide, bismaleimide, and a combination thereof. By way of example and not limitation, the PMC can also include one of the following: reinforcing material, carbon fiber, glass fiber, and a combination thereof. It should be appreciated that the substrate of which the composite core 50 is but one example can be formed of materials other than PMC. By way of example and not limitation, the substrate can be formed of the following: PMC, metal, metallic material, aluminum, aluminum alloys, iron, iron alloys, nickel, nickel alloys, titanium, titanium alloys, tungsten, tungsten, cobalt, cobalt alloys, and a combination thereof.

The cladding 70, also known as a metal leading-edge (MLE), includes a nose 72, a first sidewall 74, and a second sidewall 76. Together the nose 72, the first sidewall 74, and the second sidewall 76 define an inner surface 78. An inner cavity 82 is configured to receive the inner leading-edge 52 of the composite core 50. The inner cavity 82 is defined by the inner surface 78. According to the illustrated embodiment, the cladding 70 is a stainless steel such as a precipitation hardened stainless steel. By way of example and not limitation, precipitation hardened stainless steels that can be included in the cladding 70 include the following: 13-8 PH, 15-5 PH, 17-4 PH, 17-7 PH, and a combination thereof. It should be appreciated that cladding 70 can be any material that forms smut. By way of example and not limitation, in addition to a precipitation hardened stainless steel, the cladding 70 can be one of the following: aluminum, aluminum alloys, iron, iron alloys, nickel, nickel alloys, titanium, titanium alloys, tungsten, tungsten, cobalt, cobalt alloys, and a combination thereof.

Continuing to refer to FIG. 2, the cladding 70 is positioned around the inner leading-edge 52 and is attached to the nose 54 by a layer of adhesive 86. The layer of adhesive 86 is positioned between the inner leading-edge 52 and the inner surface 78 of the cladding 70. The layer of adhesive 86 is configured to adhere the cladding 70 to the composite core 50. By way of example and not limitation, the adhesive 86 can be one of the following: scrim-supported epoxy, unsupported epoxy, a paste, a film, organic adhesives, and a combination thereof.

A layer of smut 84 is positioned between the inner surface 78 of the cladding 70 and the adhesive 86. The smut 84 is an oxide developed on at least the inner surface 78 of the cladding 70 according to a method described further below. The smut is an oxide or a combination of oxides that includes carbon based compounds. By way of example and not limitation, the smut 84 can include one of the following: graphite, nitrides, carbides, oxyfluorides, organometallic moieties, metal oxides, organic compounds, ionic species, and a combination thereof. The smut 84 is configured to promote adhesion between the inner surface 78 and the adhesive 86. In this regard, the cladding 70 is adhered to the inner leading-edge 52 of the composite core 50 more strongly when a layer of smut is positioned on inner surface 78 as opposed to when an inner surface 78 is conventionally cleaned such that is substantially free of smut and directly contacting the adhesive 86.

When the cladding 70 is a precipitation hardened stainless steel, the thickness of the layer of smut 84 is preferably between about 0.0003 mm (0.01 mils) and about 0.05 mm (2 mils), more preferably between about 0.003 mm (0.1 mils) and about 0.03 mm (1 mil) and even more preferably between about 0.01 mm (0.4 mils) and 0.02 mm (0.6 mils) and even more preferably about 0.013 mm (0.5 mils). The layer of smut 84 is generally uniformly distributed over the inner surface 78 and it should be appreciated that the preferable thickness ranges of the layer of smut 84 depend upon the material of which the cladding 70 is formed and therefore can be different than the ranges provided above for cladding formed of precipitation hardened stainless steel.

According to one embodiment, a layer of primer 85 is positioned on the layer of smut 84 such that the later of smut 84 is between the primer 85 and the inner surface 78. The layer of primer 85 is configured to protect the layer of smut 84 and to further promote adhesion between the layer of smut 84 and the adhesive 86. By way of example and not limitation, the layer of primer 85 includes one of the following: epoxy based primers, chromated & non-chromated primers, and a combination thereof.

The present invention can be better understood by description of the formation of the layer of smut 84 in accordance with the following method. The method of the present invention can be understood with reference to the following description of the treatment and preparation of the cladding 70 prior to its adherence to the composite core 50 of the blade 10 and the application of the cladding 70 to the composite core 50. According to this example, an item such as cladding 70 formed of precipitation hardened stainless steel that is to be treated such that it can be adhered to a composite structure is provided. In a first step, the cladding 70 is subjected to a heat treating cycle. This cycle can also be referred to as an aging step. The cladding 70 is heated to a temperature of about 496° C. (925° F.) and is maintained near that temperature for a predetermined time such as about 4 hours. Alternatively, the metal from which the cladding 70 is to be formed can be subjected to the heat treating cycle prior to the formation of the cladding 70. Preferably the temperature of the aging step is between about 482° C. (900° F.) and about 704° C. (1300° F.); more preferably the temperature of the aging step is between about 496° C. (925° F.) and about 538° C. (1000° F.).

In an initial cleaning cycle, at least the inner surface 78 of the cladding 70 is cleaned according to conventional cleaning methods and cleaning cycles. The inner surface 78 is then rinsed with deionized (DI) water. Next, the inner surface 78 is rinsed with hydrochloric acid (HCl). Alternatively, the inner surface 78 is washed with hydrochloric acid. After rinsing or washing with acid, the inner surface 78 is again rinsed with DI water. The smut layer 84 is then formed on the inner surface 78. According to the illustrated example, the smut layer 84 is formed during an etching step. The etching step is performed during which the cladding 70 is immersed in a bath. According to the illustrated embodiment the bath has the following formulation: water, 930+/−15 ml (31.5+/−0.5 oz.); sulfuric acid, 150+/−5 ml (5.1+/−0.17 oz.); hydrochloric acid, 1800+/−35 ml (60.9+/−1.2 oz.); nitric acid, 500+/−10 ml (16.9+/−0.34 oz.); acetic acid, 750+/−15 ml (25.4+/−0.5 oz.); and ferric chloride, 272+/−5 grams (9.6+/−0.18 oz.). The bath temperature is preferably between about 4° C. (40° F.) and about 49° C. (120° F.) and more preferably between about 24° C. (75° F.) and about 35° C. (95° F.). The formation of the smut layer 84 occurs during the etching step. The inner surface 78 is then allowed to dry. Alternatively, the inner surface 78 can be dried by heating or other conventional means. The etching step can be a Schantz etching step or an etching step that utilizes a different etchant such as one that would be appropriate for the one of following metals and alloys that can include one of the following: Ni, Ti, Al, W, Co, and Fe.

After formation of the layer of smut 84 and prior to assembly of the fan blade 10, the visual appearance of the layer of smut 84 can be examined to determine its potential adhesion promoting characteristics. Maximum adhesion promoting characteristics are visually indicated by a uniform gray such as a gunmetal gray. Lesser adhesion promoting characteristics are visually indicated by lighter appearing areas such as light spots. Unsatisfactory adhesion promoting characteristics of the layer of smut 84 are visually indicated by the appearance of streaks or smudges.

A layer of primer 85 can be added to the layer of smut at this point in the process. The layer of primer 85 is added according to well understood processes.

The fan blade 10 is assembled in accordance with the following steps. First, the layer of adhesive 86 is positioned between the inner nose surface 54 and the layer of smut 84 of the cladding 70. Then the cladding 70 is positioned such that the layer of smut 84 is in contact with the layer of adhesive 86. The adhesive layer 86 is allowed to cure as necessary. It should be appreciated that application of the adhesive 86 can be conducted a number of ways. By way of example and not limitation, the layer of adhesive 86 can be formed according to one of the following steps: application of the adhesive to the inner nose surface 54 of the composite core 50 before contacting the adhesive 86 with the layer of smut 84, application of the adhesive to the layer of smut 84 before contacting the adhesive 86 with the inner nose surface 54, application of a portion of the adhesive layer 86 to the surface 54 and application of another portion of the adhesive layer 86 to the layer of smut 84, positioning a sheet formed of the adhesive layer 86 between the inner nose surface 54 and the layer of smut 84 and then sandwiching the sheet of the adhesive layer 86 between the inner nose surface 54 and the layer of smut 84, and a combination thereof.

The foregoing has described an apparatus and method for the formation of a turbomachinery blade having a metallic leading-edge formed of a material such as stainless steel. The advantage of the turbine blade of the present invention over the prior art is that stainless steel has a higher density and strength and modulus than titanium (Ti). This allows for reduction in nose, sidewall, leading-edge thicknesses relative to blades of the prior art. Thus turbomachinery blades made according to the present invention can be thinner and more aerodynamic than those of the prior art. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying potential points of novelty, abstract and drawings), or to any novel one, or any novel combination, of the steps of any method or process so disclosed.

What is claimed is:

1. A method for adhering a metal layer to a polymer matrix composite core, the method comprising the steps of:
   heat-treating the metal layer;
   forming a layer of smut on the metal layer, wherein the layer of smut includes an oxide;
   positioning the metal layer relative to the composite core such that the layer of smut is between the metal layer and the composite core; and
   positioning the metal layer and the composite core such that a layer of adhesive is between the layer of smut and the composite core.

2. The method according to claim 1, further comprising the step of curing the adhesive.

3. The method according to claim 1, wherein the step of forming a layer of smut includes a Schantz etching step.

4. The method according to claim 3, further comprising the step of immersing the metal layer in a bath of water, sulfuric acid, hydrochloric acid, nitric acid, acetic acid and ferric chloride for a predetermined etching duration.

5. The method according to claim 4, wherein the predetermined etching duration is between 0.1 minutes and 30 minutes.

6. The method according to claim 1, wherein during the heating step the metal layer is maintained at a predetermined temperature for a predetermined duration.

7. The method according to claim 6, wherein the predetermined temperature is between about 900° F. and about 1300° F.

8. The method according to claim 6, wherein the predetermined temperature is between about 900° F. and about 1000° F.

9. The method according to claim 6, wherein the predetermined temperature is about 925° F.

10. The method according to claim 9, wherein the predetermined duration is about 4 hours.

11. The method according to claim 6, wherein the predetermined duration is between about 2 hours and about 6 hours.

12. The method according to claim 11, wherein the predetermined duration is between about 3 hours and about 5 hours.

13. A method for adhering a steel metal layer to a polymer matrix composite core, the method comprising the steps of:
   heat-treating the steel metal layer at a predetermined temperature between about 900° F. and about 1000° F.;
   cleaning the heat-treated steel metal layer;
   forming a layer of smut on the steel metal layer by etching the cleaned, heat-treated steel metal layer, wherein the layer of smut includes an oxide;
   positioning the metal layer relative to the polymer matrix composite core such that the layer of smut is between the steel metal layer and the polymer matrix composite core; and
   positioning the steel metal layer and the polymer matrix composite core such that a layer of adhesive is between the layer of smut and the polymer matrix composite core.

* * * * *